United States Patent
Gribetz et al.

(10) Patent No.: US 10,473,935 B1
(45) Date of Patent: Nov. 12, 2019

(54) SYSTEMS AND METHODS TO PROVIDE VIEWS OF VIRTUAL CONTENT IN AN INTERACTIVE SPACE

(71) Applicant: META VIEW, INC., San Mateo, CA (US)

(72) Inventors: Meron Gribetz, Belmont, CA (US); Ashish Ahuja, Mountainview, CA (US); Raymond Chun Hing Lo, Richmond Hill (CA); Alan Beltran, Woodside, CA (US); Shengtong Chen, Palo Alto, CA (US); Run Huang, Sunnyvale, CA (US); Ting Heng Hsieh, San Mateo, CA (US); Steven Merlin Worden, Freemont, CA (US); Zhangyi Zhong, San Francisco, CA (US)

(73) Assignee: Meta View, Inc., San Mateo, CA (US)

(*) Notice: Subject to any disclaimer, the term of this patent is extended or adjusted under 35 U.S.C. 154(b) by 0 days.

(21) Appl. No.: 15/674,314

(22) Filed: Aug. 10, 2017

Related U.S. Application Data

(60) Provisional application No. 62/373,299, filed on Aug. 10, 2016.

(51) Int. Cl.
  *G02B 27/01* (2006.01)
  *G06F 3/01* (2006.01)
  (Continued)

(52) U.S. Cl.
  CPC ............ *G02B 27/0172* (2013.01); *G02B 3/14* (2013.01); *G02B 27/0179* (2013.01); *G06F 3/013* (2013.01); *G06T 19/006* (2013.01); *G02B 2027/0118* (2013.01); *G02B 2027/0123* (2013.01); *G02B 2027/0134* (2013.01); (Continued)

(58) Field of Classification Search
  CPC ...... G03B 21/005; G03B 21/26; G03B 21/28; G03B 21/2033; G03B 21/2053; G02B 27/01; G02B 27/017; G02B 27/22; G02B 27/0101; G02B 27/0172; G02B 27/0178; (Continued)

(56) References Cited

U.S. PATENT DOCUMENTS

| 2006/0120706 A1* | 6/2006 | Cho | A61B 6/466 396/17 |
| 2016/0187648 A1* | 6/2016 | Chou | G02B 27/0101 359/633 |

(Continued)

*Primary Examiner* — Sultan Chowdhury

(57) ABSTRACT

A system to provide views of virtual content in an interactive space, e.g., an augmented reality environment, may comprise one or more of a light source, directional control device, variable power lens, beam steering device, optical element, and/or one or more physical processors. A light source may generate collimated light rays in accordance with virtual content to be perceived within a three-dimensional light field. A directional control device may controllable adjust direction of travel of collimated light rays toward a beam steering device. A variable power lens may be positioned to receive collimated light rays between a light source and a directional control device. A beam steering device may be configured to direct collimated light rays to locations on an optical element. An optical element may be configured to reflect collimated light rays in a focal plane of a perceived three-dimensional light field.

20 Claims, 8 Drawing Sheets

(51) Int. Cl.
*G06T 19/00* (2011.01)
*G02B 3/14* (2006.01)
(52) U.S. Cl.
CPC ............... *G02B 2027/0185* (2013.01); *G02B 2027/0187* (2013.01)
(58) Field of Classification Search
CPC .............. G02B 27/225; G02B 27/2228; G02B 27/2235
See application file for complete search history.

(56) References Cited

U.S. PATENT DOCUMENTS

2017/0235143 A1     8/2017  Chi
2017/0285343 A1*   10/2017  Belenkii ............ G02B 27/0172

\* cited by examiner

US 10,473,935 B1

SYSTEMS AND METHODS TO PROVIDE VIEWS OF VIRTUAL CONTENT IN AN INTERACTIVE SPACE

FIELD OF THE INVENTION

The system and methods described herein relate to providing views of virtual content in an interactive space.

BACKGROUND OF THE INVENTION

There are many types of vision systems that provide virtual reality and/or augmented reality displays. In particular, wearable technology such as head mounted displays (HMD) are becoming more popular.

SUMMARY

One or more implementations of a system described herein facilitate providing views of virtual content (e.g., virtual objects in the form of three-dimensional digital imagery) in an interactive space. An interactive space may include one or more of an augmented reality environment, a virtual reality environment, and/or other interactive spaces. An augmented reality environment may include views of images forming virtual content superimposed over views of the real-world. A virtual reality environment may include views of images forming virtual content within a virtual environment. The terms "space" and "environment" may be used interchangeably herein.

Virtual content may be perceived within a three-dimensional light field within a viewing user's field-of-view to create an interactive space. Virtual content may be perceived at individual focal planes within the three-dimensional light field.

A system configured to provide views of virtual content in an interactive space may comprise one or more of one or more physical processors, one or more light sources, one or more variable power lenses, one or more directional control devices, one or more beam steering devices, one or more optical elements, and/or other components. A light source may be configured to generate light rays. The light rays may be collimated light rays. It is noted that the user of the term "light ray" is not intended to limit the scope of the disclosure to single, discrete, photons and/or packets of photons. Instead, the disclosure may envision a light ray to mean a light beam comprising multiple and continuous photons, in one or more implementations. A directional control device may be configured to controllably adjust direction of travel of collimated light rays over time toward a beam steering device. A variable power lens may be positioned to receive light rays between a light source and a directional control device. A beam steering device may be configured to direct collimated light rays to locations on an optical element. Individual locations on a beam steering device may have corresponding locations on an optical element. An optical element may be configured to reflect collimated light rays in a focal plane of a perceived three-dimensional light field.

The one or more physical processors may be configured by machine-readable instructions. Executing the machine-readable instructions may cause the one or more physical processors to facilitate providing views of virtual content in an interactive space. The machine-readable instructions may comprise one or more computer program components. The one or more computer program components may comprise one or more of a content component, a light control component, a lens control component, a direction control component, a tracking component, and/or other components.

The content component may be configured to determine virtual content to present to a user. Virtual content may include one or more virtual objects and/or other virtual content.

The light control component may be configured to control one or more light sources to generate collimated light rays in accordance with virtual content to be perceived at one or more perceived ranges of one or more focal planes of a perceived three-dimensional light field.

The lens control component may be configured to control one or more variable power lenses to adjust individual focal length of the individual lenses. In some implementations, control of a variable power lens may impact a perceived range of a focal plane within a perceived three-dimensional light field.

The direction control component may be configured to control one or more directional control devices to adjust direction of travel of collimated light rays toward one or more beam steering devices. In some implementations, control of a directional control device may impact a perceived location of virtual content on a focal plane.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
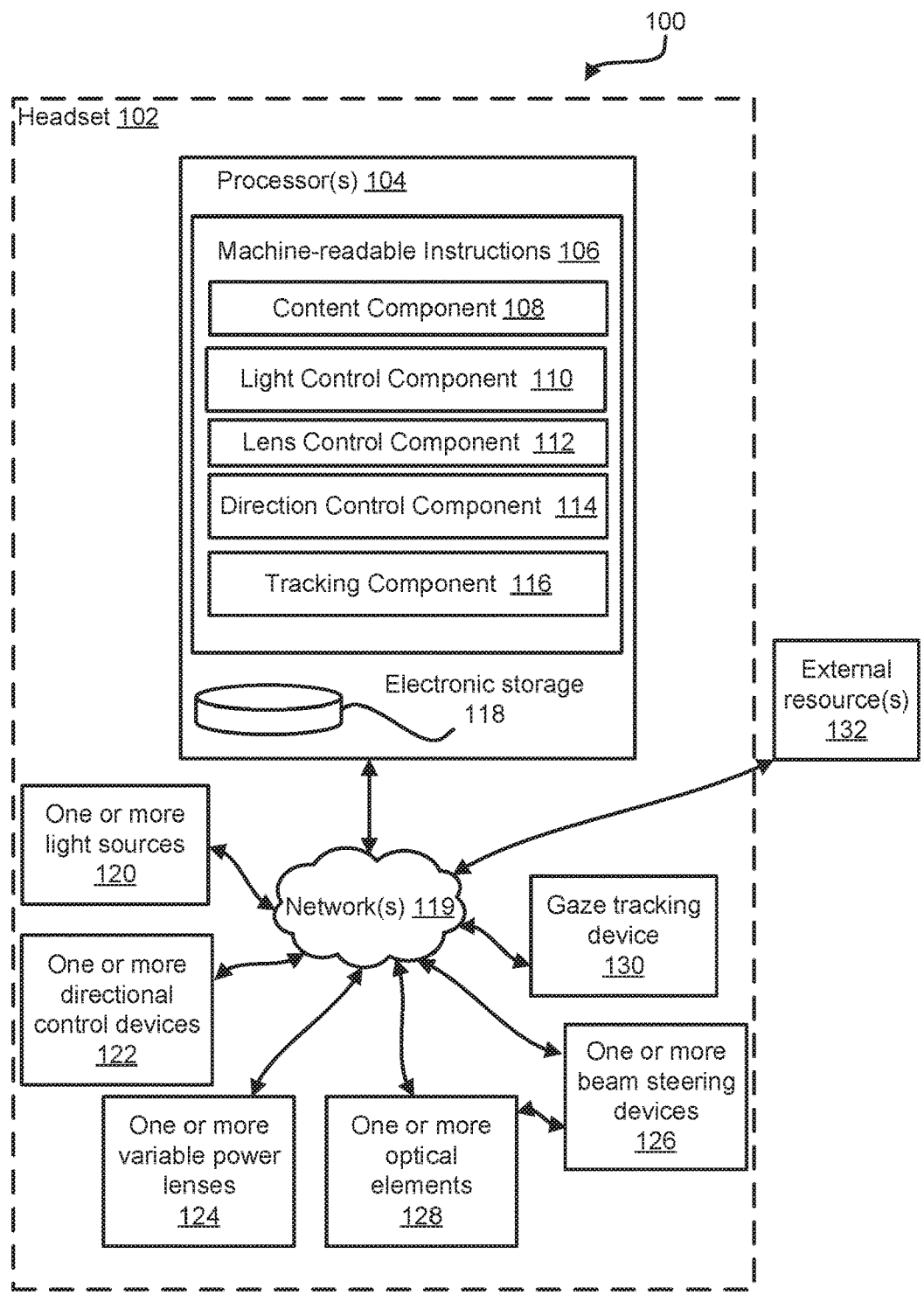
FIG. 1 illustrates a system configured to provide views of virtual content in an interactive space, in accordance with one or more implementations.

FIG. 1 shows a system 100 configured to provide views of virtual content in an interactive space. An interactive space may include one or more of an augmented reality environment, a virtual reality environment, and/or other interactive spaces. An augmented reality environment may include views of images forming virtual content superimposed over views of the real-world. A virtual reality environment may include views of images forming virtual content within a virtual environment. The terms "space" and "environment" may be used interchangeably herein. Virtual content may include one or more of virtual objects, virtual worlds, and/or other virtual content.

The human perceptual system can combine various sensory cues in an efficient manner in order to perceive "physically plausible" virtual content in a real-world environment. For example, the human perceptual system can integrate, among other things, sensory cues such as one or more of luminance, depth, and/or shape information to form or perceive coherent virtual content. As a result, the properties of the human perception may be exploited through visual systems, as described herein, employing hardware and/or software architectures to form virtual content (e.g., digital images) that may be located and/or perceived to be located in the real-world environment by virtue of neuroscience principles.

The system 100 may include one or more of a headset 102, one or more physical processors 104, one or more light sources 120, one or more directional control devices 122, one or more variable power lenses 124, one or more beam steering devices 126, one or more optical elements 128, a gaze tracking device 130, one or more diffusers (not shown in FIG. 1), and/or other components. In some implementations, one or more components of system 100 may be incorporated into and/or otherwise held by headset 102. The headset 102 may include one or more of a head-mounted display (HMD), glasses, goggles, and/or other devices. By way of non-limiting illustration, one or more optical elements 128 may comprise at least part of a visor of an HMD; and one or more of one or more physical processors 104, one or more light sources 120, one or more directional control devices 122, one or more variable power lenses 124, one or more beam steering devices 126, and/or gaze tracking device 130 may be incorporated into a frame, a head strap, a head band, temple arms, and/or other components of an HMD.

In some implementations, one or more components of system 100 may be included in one or more devices external to headset 102. For example, one or more components may be included in one or more of a desktop computer, a laptop computer, other mobile computer configurations, and/or other devices. By way of non-limiting illustration, one or more physical processors 104 and/or other components may be included in a mobile computing device external to headset 102. The headset 102 may be tethered and/or otherwise connected to the one or more external devices. Such connection may be wired (e.g., USB and/or other wired connection) and/or wireless (e.g., Bluetooth, Wi-Fi, and/or other wireless connection).

In some implementations, individual light sources of the one or more light sources 120 may be configured to generate collimated light rays and/or other light rays forming images of virtual content. A light source may comprise one or more of a laser, an RGB laser, an LED, an LED illuminated liquid crystal on silicon (LCOS), a digital light projector (DLP), a digital micromirror device (DVD), an OLED microdisplay, and/or other light sources. In some implementations, a light source may generate light rays based on one or more color parameters of the light rays and/or other parameters of the collimated light rays. Color parameters may include one or more of a first color parameter, a second color parameter, a third color parameter, and/or other color parameters. A value of a first color parameter may specify one or more of a luminous intensity, a chromaticity, a brightness, and/or other attributes of a first color. A value of a second color parameter may specify one or more of a luminous intensity, a chromaticity, a brightness, and/or other attributes of a second color. A value of a third color parameter may specify one or more of a luminous intensity, a chromaticity, a brightness, and/or other attributes of a third color. By way of non-limiting illustration, for an RGB laser, the first color may be red, the second color may be green, and/or the third color may be blue.

In some implementations, individual variable power lens of one or more variable power lenses 124 may comprise one or more of a liquid lens, a liquid crystal tunable lens, and/or other variable power lenses. An individual variable power lens may be adjustable to change a focal length of the variable power lens and/or other attributes of the variable power lens (see, e.g., lens control component 112).

In some implementations, individual directional control devices of one or more direction control devices 122 may be configured to controllably adjust direction of travel of collimated light rays. Individual directional control devices of one or more direction control devices 122 may be arranged to receive collimated light rays from one or both of an individual light source and/or an individual variable power lens. In some implementations, direction of travel may be adjusted such that collimated light rays may be directed toward one or more beam steering devices 126. In some implementations, a directional control device may comprise a micro-electrical-mechanical system (MEMS) and/or other devices. By way of non-limiting illustration, a MEMS-based directional control device may utilize micro-mirrors and/or other components to facilitate controllable adjustment of direction of travel of collimated light rays, e.g., toward one or more beam steering devices 126.

In some implementations, individual beam steering devices of one or more beam steering devices 126 may be configured to direct collimated light rays to locations on one or more optical elements 128. Individual beam steering devices of one or more beam steering devices 126 may be arranged to receive collimated light rays from one or more of an individua light source, an individual variable power lens, an individual directional control device, and/or other components. In some implementations, individual locations on individual ones of one or more beam steering devices 126 may have corresponding locations on individual ones of one or more optical elements 128. For example, collimated light rays which may be received at a given location of a beam steering device, may pass through the beam steering device and be directed to a predetermined location on an optical element. In some implementations, correspondences between locations on a beam steering device that receive light and locations on an optical element where the light may be directed to after passing through the beam steering device may be known and/or controllable.

By way of non-limiting illustration, controlling direction of travel of collimated light using a beam steering device may be accomplished by one or more of changing a refractive index of a medium of the beam steering device through which light rays may be transmitted, control of mirrors, prisms, lenses, rotating diffraction gratings, and/or other components of a beam steering device, and/or other techniques.

In some implementations, individual optical elements of one or more optical elements 128 may comprise one or more reflective, or partially reflective surfaces. A reflective, or partially reflective surface may be provided by applying a coating of reflective, or partially reflective material. An optical element may be formed from a reflective and/or partially reflective material. A reflective and/or partially reflective material may comprise one or more of ZEONEX, polycarbonate, PMMA, and/or other materials. Light may be reflected by one or more optical elements 128 to the eyes of the user who may perceive the reflected light as virtual content within their field-of-view.

In some implementations, an optical element may comprise one or more of a waveguide optic, a diffractive optical element, a holographic optical element, and/or other optical elements.

In some implementations, an optical element may comprise one or more of a waveguide, optical coupling features, and/or other components. A waveguide may include one or more of a layered waveguide, a planar partial mirror array waveguide, a diffractive waveguide, a diffractive waveguide including Bragg gratings, a free form surface prism, and/or other waveguides. In some implementations, a waveguide may include and/or may be coupled with optical coupling features configured to couple light rays into the waveguide. Light rays coupled into a waveguide may be propagated through the waveguide and guided out of the waveguide toward one or more eyes of a user.

In some implementations, one or more optical elements 128 may be positioned relative to one or more beam steering devices 126 and/or other components to provide light to the eye(s) of a user. The provided light may generate a perceived gradient three-dimensional light field within the field-of-view of the user. The three-dimensional light field may comprise one or more virtual focal planes. Individual perceived ranges of individual ones of the focal planes may be determined based on control of individual ones of the one or more variable power lenses 124 (see, e.g., lens control component 112) and/or other components of system 100.

In some implementations, individual ones of one or more optical elements 128 may be curved at one or more regions. In some implementations, the curvature of an optical element may cause a focal plane to be a curved plane in space. In some implementations, due to curvature, virtual content appearing at a top part of a focal plane may be perceived to be closer to a user than virtual content appearing at a bottom part of a focal plane.

In some implementations, gaze tracking device 130 be configured to generate output signals conveying one or more of gaze information, distance information, and/or other information (see, e.g., tracking component 116). Gaze information may include one or more of gaze direction of a user over time, gaze position (e.g., a convergence point in space) of a user over time, and/or other information. Distance information may comprise distance of one or more real-world objects along a user's gaze direction over time.

The gaze tracking device 130 may include one or more of a sensor, an emitter, and/or other components. The emitter may be configured to emit light. The emitter may comprise an infrared (IR) emitter configured to emit IR light. In some implementations, a sensor may comprise one or more of an IR sensor, an image sensor, and/or other sensors. A sensor may be incorporated into a camera and/or other devices. By way of non-limiting illustration, a sensor of gaze tracking device 130 may comprise an IR camera and/or other devices. In some implementations, output signals of one or more sensors of gaze tracking device 130 may convey one or more of positions of one or more pupils of a user relative to a locus of a reflectance of light emitted by an emitter of gaze tracking device 130, and/or other information. Output signals of one or more sensors of gaze tracking device 130 may be used to determine gaze information, distance information, and/or other information (see, e.g., tracking component 116).

Figure 2:
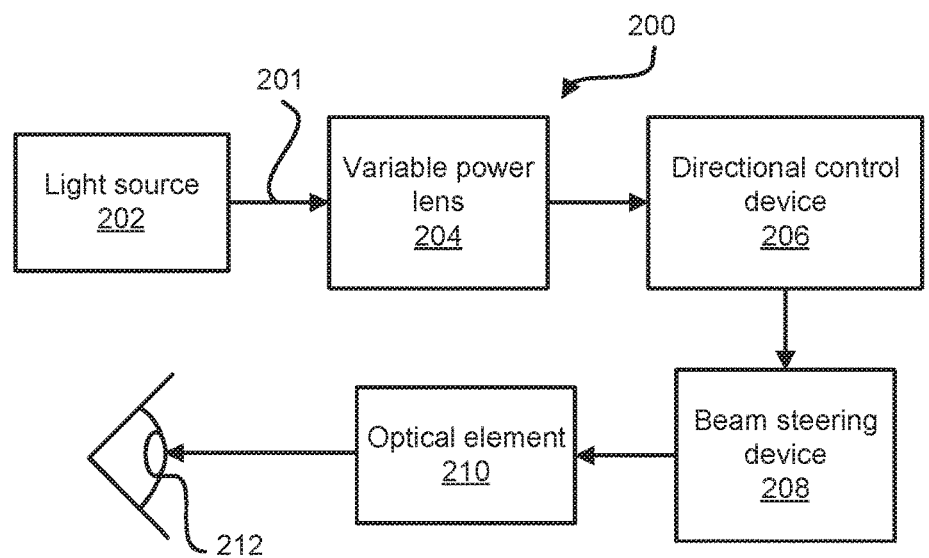
FIG. 2 illustrates an exemplary configuration of a system configured to provide views of virtual content in an interactive space, in accordance with one or more implementations.

FIG. 2 illustrates an exemplary configuration of a system 200 configured to provide views of virtual content in an interactive space, in accordance with one or more implementations. The system 200 may include one or more components described in system 100 (FIG. 1) and/or other components. The system 200 may include one or more of a light source 202, a variable power lens 204, a directional control device 206, a beam steering device 208, an optical element 210, one or more processors (not shown in FIG. 2), and/or other components. FIG. 2 illustrates a path of a light ray 201 emitted from light source 202. The light ray 201 may travel from light source 202 into variable power lens 204. The light ray 201 may exit variable power lens 204 and encounter (including "intersecting" or "striking") directional control device 206. The light ray 201 may exit directional control device 206 and encounter beam steering device 208. The light ray 201 may exit beam steering device 208 and encounter optical element 210. The optical element 210 may provide (e.g., via reflection or guiding) light ray 201 to a user's eye 212 (or eyes).

Figure 11:
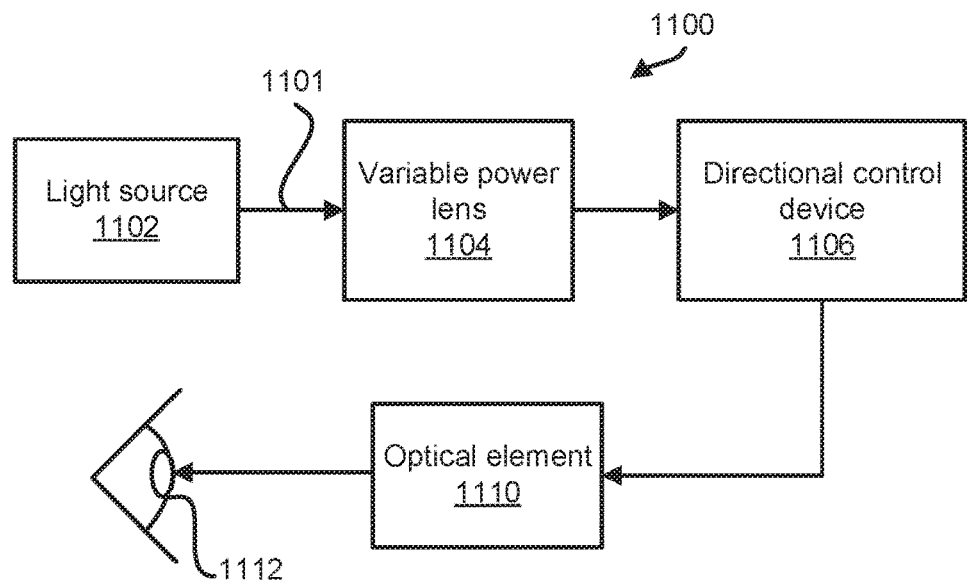
FIG. 11 illustrates an exemplary configuration of a system configured to provide views of virtual content in an interactive space, in accordance with one or more implementations.

FIG. 11 illustrates an exemplary configuration of a system 1100 configured to provide views of virtual content in an interactive space, in accordance with one or more implementations. The system 1100 may include one or more components described in system 100 (FIG. 1), and/or other components. The system 1100 may include one or more of a light source 1102, a variable power lens 1104, a directional control device 1106, an optical element 1110, one or more processors (not shown in FIG. 11), and/or other components. FIG. 11 illustrates a path of a light ray 1101 emitted from light source 1102. The light ray 1101 may travel from light source 1102 into variable power lens 1104. The light ray 1101 may exit variable power lens 1104 and encounter directional control device 1106. The light ray 1101 may exit directional control device 1106 and encounter optical element 1110. The optical element 1110 may provide light ray 1101 to a user's eye 1112 (or eyes). In the implementation shown, a beam steering device may be omitted. The directional control device 1106 may be configured to direct collimated light rays (e.g., light ray 1101) to locations on one or more optical elements (e.g., optical element 1110).

Figure 12:
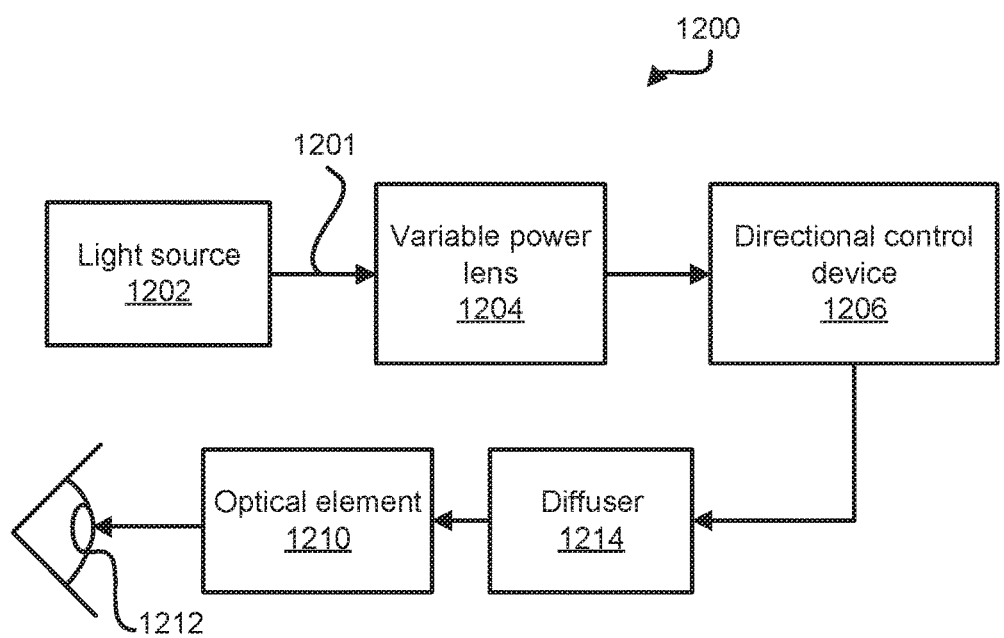
FIG. 12 illustrates another exemplary configuration of a system configured to provide views of virtual content in an interactive space, in accordance with one or more implementations.

FIG. 12 illustrates an exemplary configuration of a system 1200 configured to provide views of virtual content in an interactive space, in accordance with one or more implementations. The system 1200 may include one or more components described in system 100 (FIG. 1), and/or other components. The system 1200 may include one or more of a light source 1202, a variable power lens 1204, a directional control device 1206, an optical element 1210, a diffuser 1214, one or more processors (not shown in FIG. 12), and/or other components. The diffuser 1214 may be configured to diffuse light. The diffuser 1214 may be positioned to receive collimate light rays between directional control device 1206 and optical element 1210. The diffuser 1214 may be included with (e.g., operatively coupled to) optical element 1210. The diffuser 1214 may be configured to act as a projection screen. The diffuser 1214 may be configured for rear projection. The diffuser 1214 may be configured to have characteristics including one or more of, high transmission, high contrast, uniform, angle controllable, and/or other characteristics. The diffuser 1214 may comprise a Lambertian diffuser and/or other diffusers. FIG. 12 illustrates a path of a light ray 1201 emitted from light source 1202. The light ray 1201 may travel from light source 1202 into variable power lens 1204. The light ray 1201 may exit variable power lens 1204 and encounter directional control device 1206. The light ray 1201 may exit directional control device 206 and encounter diffuser 1214. The light ray 1201 may exit diffuser 1214 and encounter optical element 1210. The optical element 1210 may provide light ray 1201 to a user's eye 1212 (or eyes).

Figure 3:
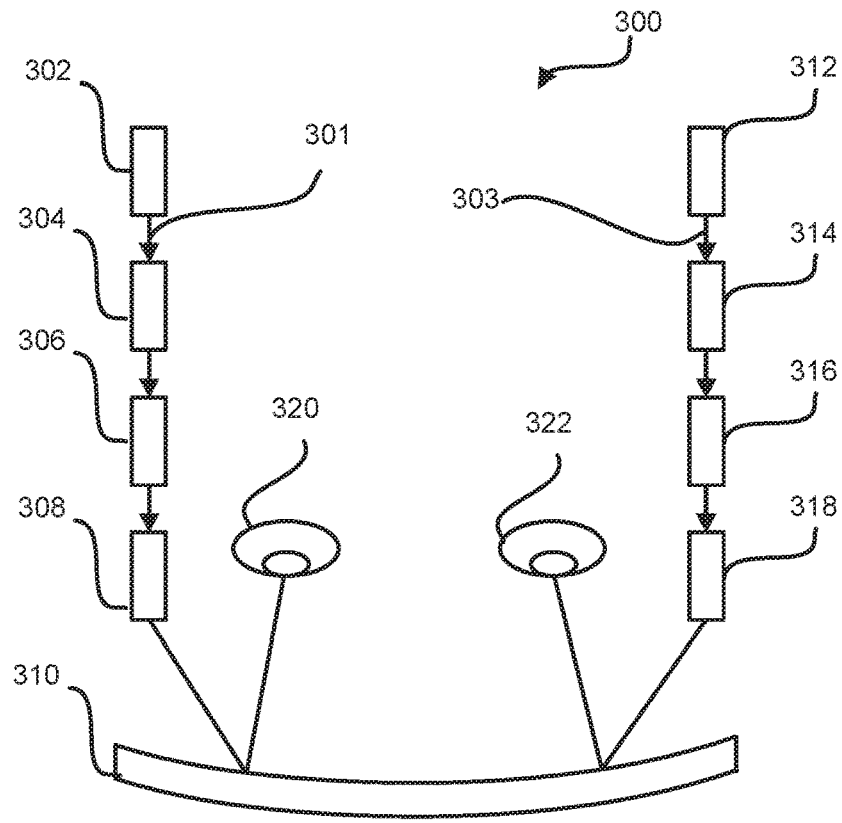
FIG. 3 illustrates another exemplary configuration of a system configured to provide views of virtual content in an interactive space, in accordance with one or more implementations.

FIG. 3 illustrates an exemplary configuration of a system 300 configured to provide views of virtual content in an interactive space, in accordance with one or more implementations. The system 300 may include one or more components described in system 100 (FIG. 1) and/or other components. The system 300 may include one or more of a first light source 302, a first variable power lens 304, a first directional control device 306, a first beam steering device 308, a second light source 312, a second variable power lens 314, a second directional control device 316, a second beam steering device 318, an optical element 310, one or more processors (not shown in FIG. 3), and/or other components. In some implementations, one or more of the components shown may be eliminated and/or one or more other components not shown may be included.

FIG. 3 illustrates paths of a first light ray 301 emitted from first light source 302 and a second light ray 303 emitted from second light source 312. The first light ray 301 may travel from first light source 302 into first variable power lens 304. The first light ray 301 may exit first variable power lens 304 and encounter first directional control device 306. The first light ray 301 may exit first directional control device 306 and encounter first beam steering device 308. The first light ray 301 may exit first beam steering device 308 and encounter a portion of optical element 310 arranged near a first eye 320. The first light ray 301 may be provided to first eye 320 of a user via optical element 310. The second light ray 303 may travel from second light source 312 into second variable power lens 314. The second light ray 303 may exit second variable power lens 314 and encounter second directional control device 316. The second light ray 303 may exit second directional control device 316 and encounter second beam steering device 318. The second light ray 303 may exit second beam steering device 318 and encounter a portion of optical element 310 arranged near a second eye 322 of the user. The second light ray 303 may be provided to second eye 322 via optical element 310.

In some implementations, one or more components of system 300 may be incorporated into a headset (not shown in FIG. 3) and/or other device. By way of non-limiting illustration, one or more of first light source 302, first variable power lens 304, first directional control device 306, first beam steering device 308, and/or other components may be incorporated into a first side of a head strap, head band, temple arms, and/or other components of a headset. One or more of second light source 312, second variable power lens 314, second directional control device 316, second beam steering device 318, and/or other components may be incorporated into a second side of a head strap, head band, temple arms, and/or other components of the headset.

Figure 10:
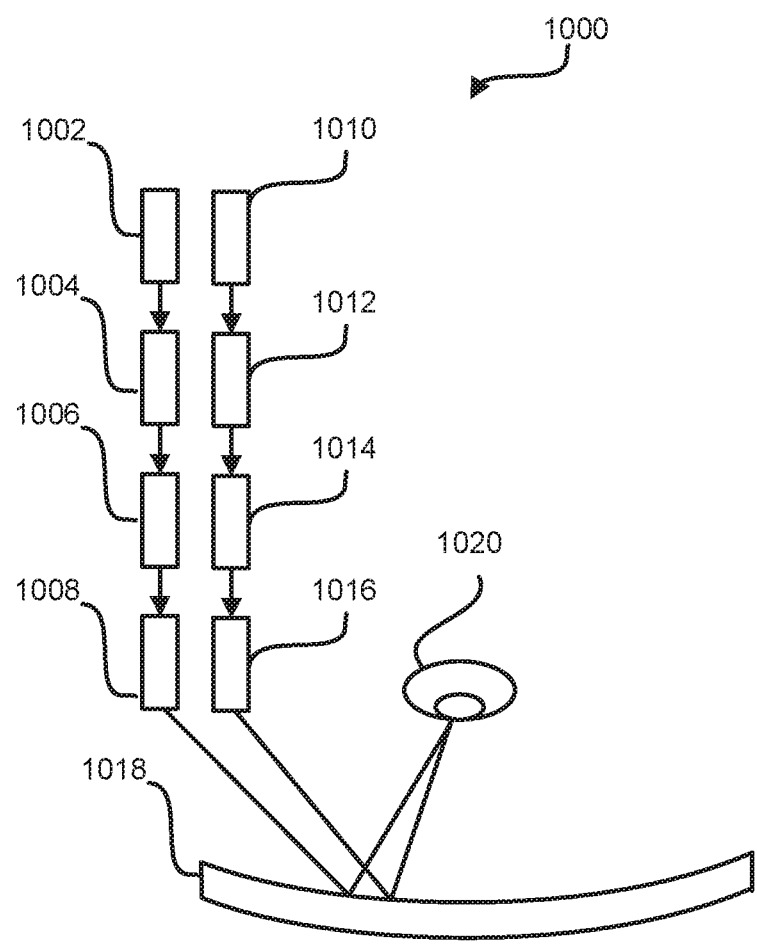
FIG. 10 illustrates another exemplary configuration of a system configured to provide views of virtual content in an interactive space, in accordance with one or more implementations.

It is noted that the depiction and arrangement of components of system 300 in FIG. 3 is for illustrative purposes only and are not to be considered limiting. For example, in some implementations, multiple sets of components (e.g., a set of components comprising one or more of a light source, variable power lens, direction control device, and beam steering device) may be arranged on individual sides of a headset. By way of non-limiting illustration, FIG. 10 shows a system 1000 configured to provide views of virtual content in an interactive space. The system 1000 may include one or more components described in system 100 (FIG. 1), system 300 (FIG. 1), and/or other components. The system 1000 may include multiple sets of components arranged to provide light into at least one eye 1020 of a user. The system 1000 one or more of a first light source 1002, a first variable power lens 1004, a first directional control device 1006, a first beam steering device 1008, a second light source 1010, a second variable power lens 1012, a second directional control device 1014, a second beam steering device 1016, an optical element 1018, one or more processors (not shown in FIG. 10), and/or other components. In some implementations, one or more of the components shown may be eliminated and/or one or more other components not shown may be included. It is noted that although only two sets of components are shown in FIG. 10 to provide light rays into the eye 1020 of a user, in other implementations, more sets of component may be provided. Multiple sets of components may be arranged in one or more of a tiled (e.g., side-by-side), stacked (e.g., one atop another), and/or other configurations.

Returning to FIG. 1, in some implementations, one or more physical processors 104 may be configured by machine-readable instructions 106. Executing machine-readable instructions 106 may cause one or more physical processors 104 to facilitate providing views of virtual content in an interactive space. The machine-readable instructions 106 may include one or more of a content component 108, a light control component 110, a lens control component 112, a direction control component 114, a tracking component 116, and/or other components.

In some implementations, content component 108 may be configured to determine virtual content to present to a user. Virtual content may include one or more virtual objects and/or other virtual content. Virtual content may be in the form of digital imagery generated by one or more light sources 120.

In some implementations, light control component 110 may be configured to control individual ones of one or more light sources 120. Individual ones of one or more light sources 120 may be controlled to generate collimated light rays in accordance with virtual content to be perceived at one or more ranges of one or more focal planes of a three-dimensional light field.

In some implementations, controlling one or more light sources 120 and/or other components of system 100 may cause collimated light rays to be provided to a user's eye(s), wherein the user may perceive virtual content in three-dimensional space within their field-of-view of the real-world. The virtual content may be perceived by the viewing user to lie within three-dimensional real space at a range that may be equal to a range of a focal plane within the viewing user's field-of-view, and/or other ranges. In some implementations, control of individual ones of one or more light sources 120 may be based on virtual content determined to be presented to a user (e.g., via content component 108), and/or other information. By way of non-limiting illustration, a light source may generate collimated light to generate a digital image, which when provided to a user's eyes (e.g., via one or more optical elements 128), may be perceived as virtual content in three-dimensional space within the user's field-of-view of the real-world.

The lens control component 112 may be configured to control individual ones of one or more variable power lenses 124. Control of individual ones of one or more variable power lenses 124 may include adjusting individual focal lengths of individual ones of one or more variable power lenses 124. In some implementations, control of one or more variable power lenses 124 may impact individual perceived ranges of individual focal planes within a three-dimensional light field.

In some implementations, increasing the focal length of a variable power lens (e.g., decreasing it's optical power) may cause a range of a focal plane within a perceived three-dimensional light field to decrease. Virtual content placed at that focal plane may appear relatively closer to the user. Increasing a focal length of a lens may mean more work needs by done by the eye's crystalline lens to focus a point on the retina. This flexing of the ciliary muscles may cause the human visual system to perceive virtual content as being relatively closer.

In some implementations, decreasing the focal length of a variable power lens (e.g., increasing the optical power) may cause a range of a focal plane within a perceived three-dimensional light field to increase. Virtual content placed at that focal plane may appear relatively farther from the user. Decreasing the focal length may mean less work may be done by the eye's crystalline lens to focus the point on the retina. The relaxation of the ciliary muscles may cause the human visual system to perceive virtual content as being relatively farther away.

The direction control component 114 may be configured to control individual ones of one or more directional control devices 122. Control of individual ones of one or more directional control devices 122 may include adjusting direction of travel of collimated light rays. In some implementations, direction of travel of collimated light rays may be adjusted towards individual ones of one or more beam steering devices 126 and/or other components. In some implementations, control of a directional control device may impact a perceived location of virtual content on a focal plane (see, e.g., FIG. 6). For example, the location where a light ray is received by a beam steering device may dictate a location where the light ray may be reflected off an optical element and into a user's eye(s). The location where the light ray is reflected off the optical element may dictate a perceived location of where virtual content may appear on a focal plane.

In some implementations, tracking component 116 may be configured to determine one or more of gaze information, distance information, and/or other information. In some implementation, gaze information may be determined from output signals from one or more sensors of gaze tracking device 130, and/or other information. Gaze information may include one or more of gaze direction of a user over time, a gaze position (e.g., a convergence point in space) of a user over time, and/or other information. In some implementations, gaze information may be determined with respect to a user's pupil and/or other reference point. By way of non-limiting illustration, gaze information may be determined from output signals of one or more sensors of gaze tracking device 130. The output signals may convey one or more of positions of one or more pupils of a user relative to a locus of a reflectance of light emitted by an emitter of gaze tracking device 130, and/or other information used to determine gaze information. In some implementations, gaze direction may be expressed as a vector within a three-dimensional coordinate system, and/or expressed in other ways.

Distance information may comprise distance of one or more real-world objects along a user's gaze direction over time. In some implementations, distance of one or more real-world objects along a user's gaze direction over time may be determined from a determined gaze direction, gaze position, and/or other information. By way of non-limiting illustration, based on output signals of one or more sensors of gaze tracking device 130, a gaze direction may be determined. Presence of one or more real-world objects along the gaze direction, and corresponding distances from the user, may be determined. By way of further non-limiting illustration, based on output signals of one or more sensors of gaze tracking device 130, a gaze position, e.g., a three-dimensional convergence point in space, may be triangulated. The distance of the convergence point from the user and/or other reference point may be included in the distance information.

In some implementations, tracking component 116 may be configured to determine ranges of one or more target focal planes. A target focal plane may comprise a vertical two-dimensional plane in space at which virtual content may be perceived. A range of a target focal plane may be determined based on one or more of gaze information, distance information, and/or other information. A range of a target focal plane may correspond to one or more of a current gaze position (e.g., convergence point), a distance of one or more real-world objects along a user's current gaze direction, and/or other locations. For example, the user may have their eyes focused at a distance corresponding to one or more real-world objects along their gaze direction. By providing virtual content at that distance, the user may not need to readjust their focus to view the virtual content.

In some implementations, lens control component 112 may be configured to control individual ones of one or more variable power lenses 124 such that virtual content may be perceived at ranges of one or more target focal planes. By way of non-limiting illustration, tracking component 116 may be configured to determine distance information conveying a first distance of a first real-world object along a gaze direction for a first period of time. In some implementations, the first distance may be determined as a convergence point where a user may be focusing their vision. The lens control component 112 may be configured to control a variable power lens such that a perceived range of virtual content on a focal plane corresponds to the first distance during the first period of time. 999

In some implementations, individual variable power lenses and/or directional control devices may be selectively controlled depending on a user's focus within a target focal plane. As previously pointed out, focal planes may be slanted and/or curved due to the curvature of an optical element. For example, a top portion of a focal plane may be closer to the user than a bottom portion. If virtual content is to be presented at different portions of a target virtual focal plane, one or both of a variable power lens and/or directional control device may be controlled to bring virtual content into focus. In some implementations, one or more processor components may be configured to determine a fixation point of the user on a target focal plane. One or more processor components may be configured to control one or both of a variable power lens and/or directional control device to focus virtual content at that fixation point of the target focal plane. In this example, one or more processor components may determine what virtual object a user may be looking at on a target focal plane based on feedback from gaze tracking device 130. For example, gaze tracking device 130 may generate output conveying a position of a user's eyes; and one or more processor components may be configured to determine a convergence point in a three-dimensional space, adjust a focal plane based on the determined convergence point, and/or render depth dependent disparity and blur for a displayed image based on the adjusted focal plane.

Figure 4:
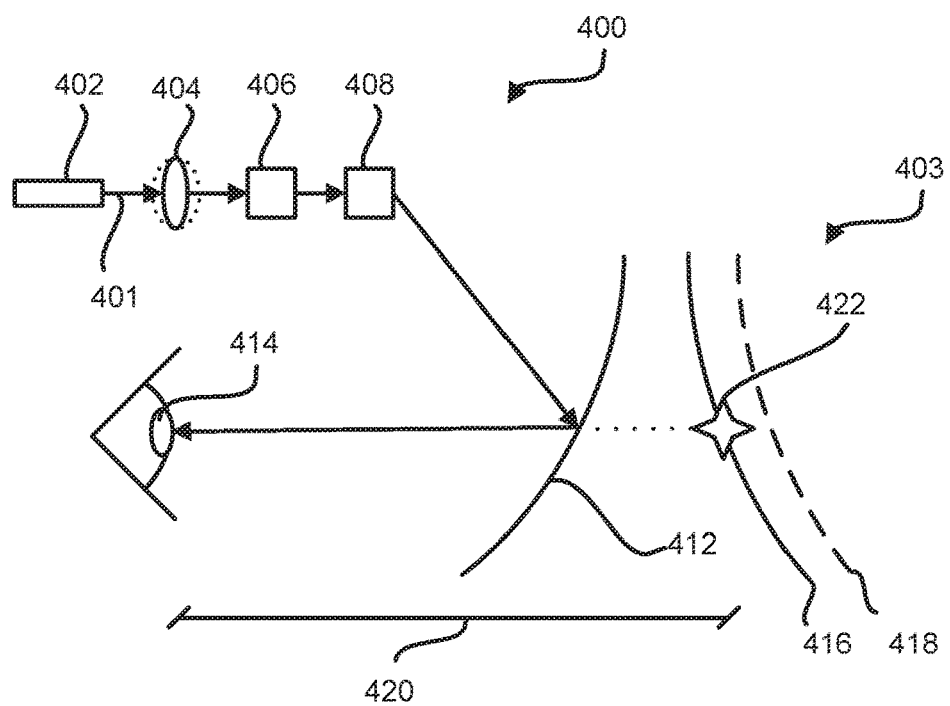
FIG. 4 illustrates another exemplary configuration of a system configured to provide views of virtual content in an interactive space, in accordance with one or more implementations.

FIG. 4 illustrates an exemplary configuration of a system 400 configured to provide views of virtual content in an interactive space, in accordance with one or more implementations. The system 400 may include one or more components described in system 100 (FIG. 1) and/or other components. The system 400 may include one or more of a light source 402, a variable power lens 404, a directional control device 406, a beam steering device 408, an optical element 412, one or more physical processors (not shown), and/or other components. FIG. 4 illustrates a path of a light ray 401 emitted from light source 402. The light ray 401 may travel from light source 402 into variable power lens 404. The light ray 401 may exit variable power lens 404 and encounter directional control device 406. The light ray 401 may exit directional control device 406 and encounter beam steering device 408. The light ray 401 may exit beam steering device 408 and encounter optical element 412. The light ray 401 may be provided to a user's eye 414 (or eyes) via optical element 412.

Figure 5:
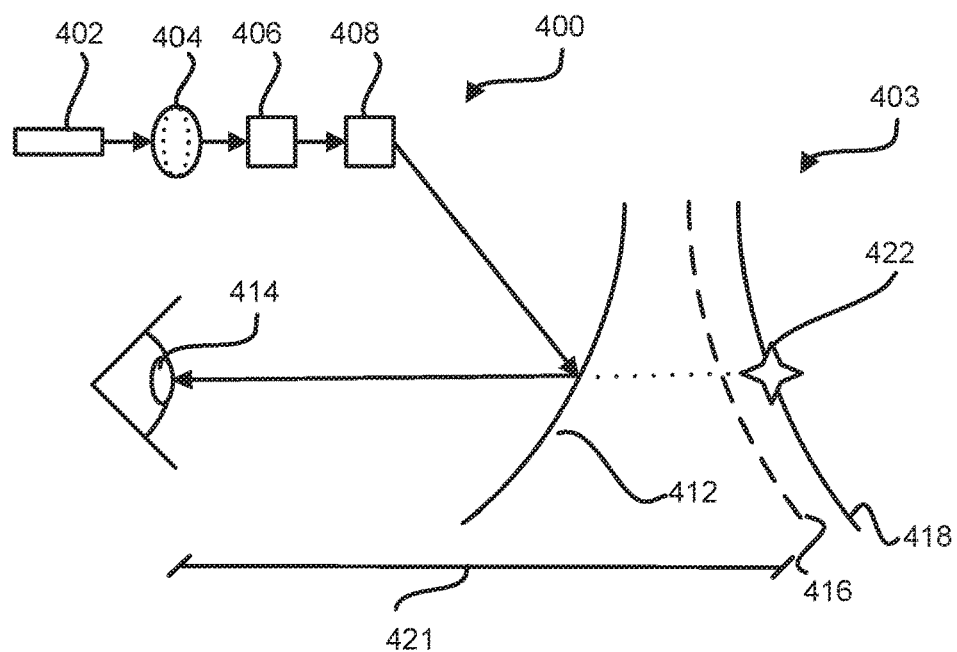
FIG. 5 illustrates another exemplary configuration of a system configured to provide views of virtual content in an interactive space, in accordance with one or more implementations.

In FIG. 4, light generated by light source 402 may define digital imagery which, when provided to user's eye 414, may generate virtual content 422 that may be perceived within a three-dimensional light field 403 in the user's field-of-view. In some implementations, due to a curvature of optical element 412, corresponding potential focal planes 416 and/or 418 may also exhibit a curvature in space. The control of variable power lens 404 may impact a perceived range 420 of a focal plane within three-dimensional light field 403. By way of non-limiting illustration, focal plane 416 may correspond to a first configuration of variable power lens 404 (e.g., a relatively increased focal length of variable power lens 404); and focal plane 418 may correspond to a second configuration of variable power lens 404 (e.g., a relatively decreased focal length of variable power lens 404). By way of non-limiting illustration, focal plane 416 may be perceived as closer to the viewing user than focal plane 418 due to the focal length of variable power lens 404 being relatively greater in the first configuration than the second configuration. FIG. 5 illustrates system 400 with variable power lens 404 in the second configuration such that virtual content 422 may be perceived at an adjusted range 421 corresponding to focal plane 418. The perceived range 421 in FIG. 5 may be farther than perceived range 420 in FIG. 4.

It is noted that although only two discrete focal planes are shown in the figures, this is for illustrative purposes only. It is to be understood that variable power lens 404 may be incrementally adjusted to obtain incremental adjustments to a perceived range of a focal plane within three-dimensional light field 403.

Figure 6:
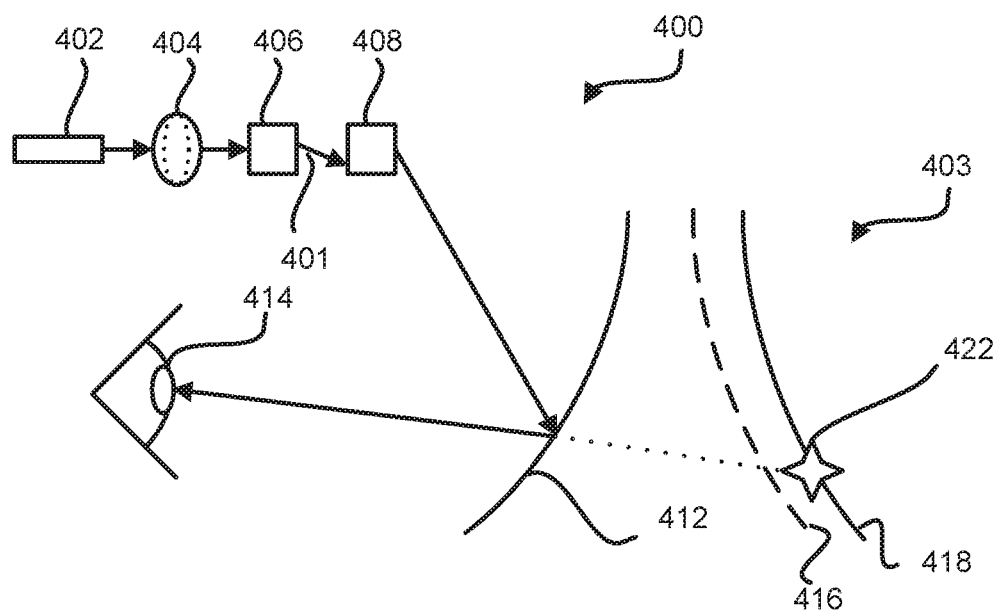
FIG. 6 illustrates another exemplary configuration of a system configured to provide views of virtual content in an interactive space, in accordance with one or more implementations.

FIG. 6 illustrates system 400 and a feature of the control of directional control device 406 to impact perceived location of virtual content 422 on a focal plane (e.g., focal plane 418). By way of non-limiting illustration, changing the location on beam steering device 408 that light ray 401 is received may impact the location where light ray 401 may encounter optical element 412. The location at which light ray 401 encounters optical element 412 may impact a perceived location of virtual content 422 on a given focal plane, e.g., focal plane 418. For example, by controlling the location at which light ray 401 reflects off optical element 412 (e.g., via control of directional control device 406), virtual content 422 may be perceived at different locations on focal plane 418 (compared to the location of virtual content 422 in FIG. 5). Although only two positions of virtual content are shown in FIG. 5 and FIG. 6, it is to be understood that incremental adjustments to the location at which light ray 401 is received by beam steering device 408 may be made to obtain incremental adjustments to perceived location of virtual content 422 on one or more focal planes.

Figure 7:
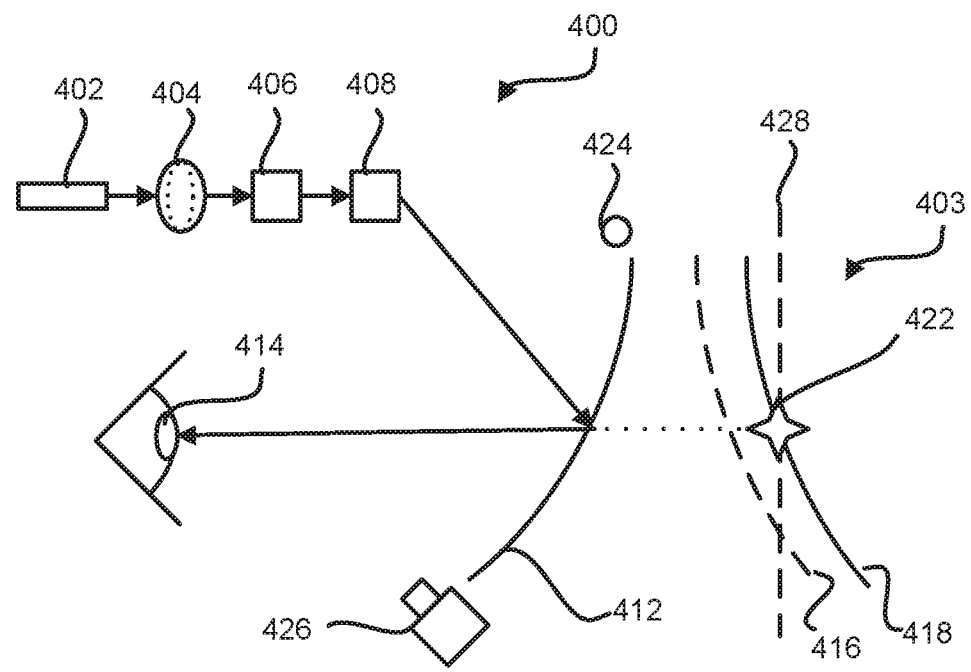
FIG. 7 illustrates another exemplary configuration of a system configured to provide views of virtual content in an interactive space, in accordance with one or more implementations.
Figure 8:
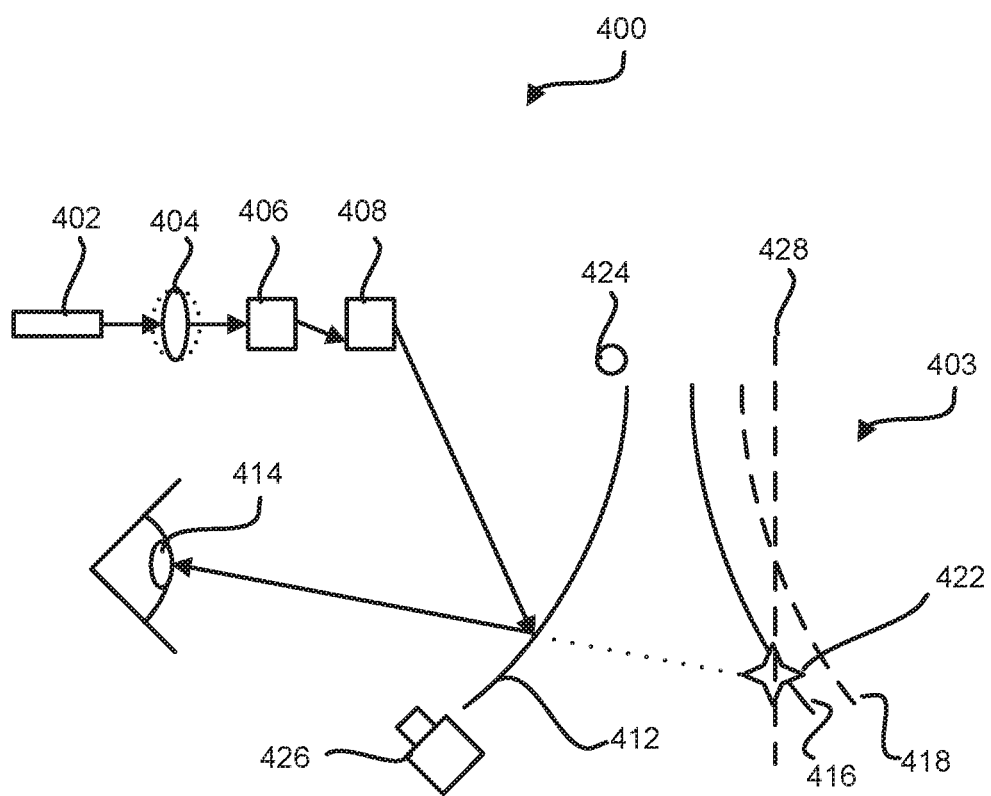
FIG. 8 illustrates another exemplary configuration of a system configured to provide views of virtual content in an interactive space, in accordance with one or more implementations.

FIGS. 7-8 illustrate controlling one or more components of system 400 to maintain a perception of virtual content 422 on a target focal plane 428. The system 400 may further include a gaze tracking device comprising an emitter 424 and a sensor 426.

In FIG. 7, potential focal planes 416 and 418 corresponding to different configurations of variable power lens 404 are shown. In some implementations, due to a curvature of optical element 412, focal planes 416 and 418 may also exhibit a curvature in space. In general, it may be desired to control one or both of variable power lens 404 and/or directional control device 406 in a manner that facilitates maintaining an intersection of virtual content 422 appearing on a focal plane with target focal plane 428. By way of non-limiting illustration, variable power lens 404 may be controlled to adjust perceived range of virtual content 422 and/or directional control device 406 may be controlled to adjust the location of virtual content on a focal plane at the perceived range to maintain an intersection of virtual content 422 appearing on a focal plane with target focal plane 428.

By way of non-limiting illustration, FIG. 8 shows control of one or both of variable power lens 404 to adjust a perceived range of virtual content 422 to be at a range of focal plane 416 (as opposed to focal plane 418 in FIG. 7) and/or directional control device 406 to adjust a perceived location of virtual content 422 on focal plane 416 to maintain an intersection of virtual content 422 with target focal plane 428.

Returning to FIG. 1, processor(s) 104, one or more light sources 120, one or more directional control devices 122, one or more variable power lenses 124, one or more beam steering devices 126, gaze tracking device 130, external resource(s) 132, and/or other components may be operatively linked via one or more electronic communication links. For example, such electronic communication links may be established, at least in part, via network(s) 119. The network(s) 119 may comprise one or both of wired or wireless communications. It will be appreciated that this is not intended to be limiting and that the scope of this disclosure includes implementations in which processor(s) 104, one or more light sources 120, one or more directional control devices 122, one or more variable power lenses 124, one or more beam steering devices 126, gaze tracking device 130, external resource(s) 132, and/or other components may be operatively linked via some other communication media.

The external resource(s) 132 may include sources of information, hosts, external entities participating with system 100, providers of virtual content, and/or other resources. In some implementations, some or all of the functionality attributed herein to external resource(s) 132 may be provided by resources included in system 100.

The processor(s) 104 may include and/or have access to electronic storage 118, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

The electronic storage 118 may comprise electronic storage media that electronically stores information. The electronic storage media of electronic storage 118 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. The electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). The electronic storage 118 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute components 108, 110, 112, 114, and/or 116. Processor(s) 104 may be configured to execute components 108, 110, 112, 114, and/or 116 by software; hardware; firmware; some combination of software, hardware, and/or firmware; and/or other mechanisms for configuring processing capabilities on processor(s) 104.

It should be appreciated that although components 108, 110, 112, 114, and/or 116 are illustrated in FIG. 1 as being co-located within a single processing unit, in implementations in which processor(s) 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor(s) 104 may be configured to execute one or more additional components that may perform some or all of the functionality attributed to one of components 108, 110, 112, 114, and/or 116.

Figure 9:
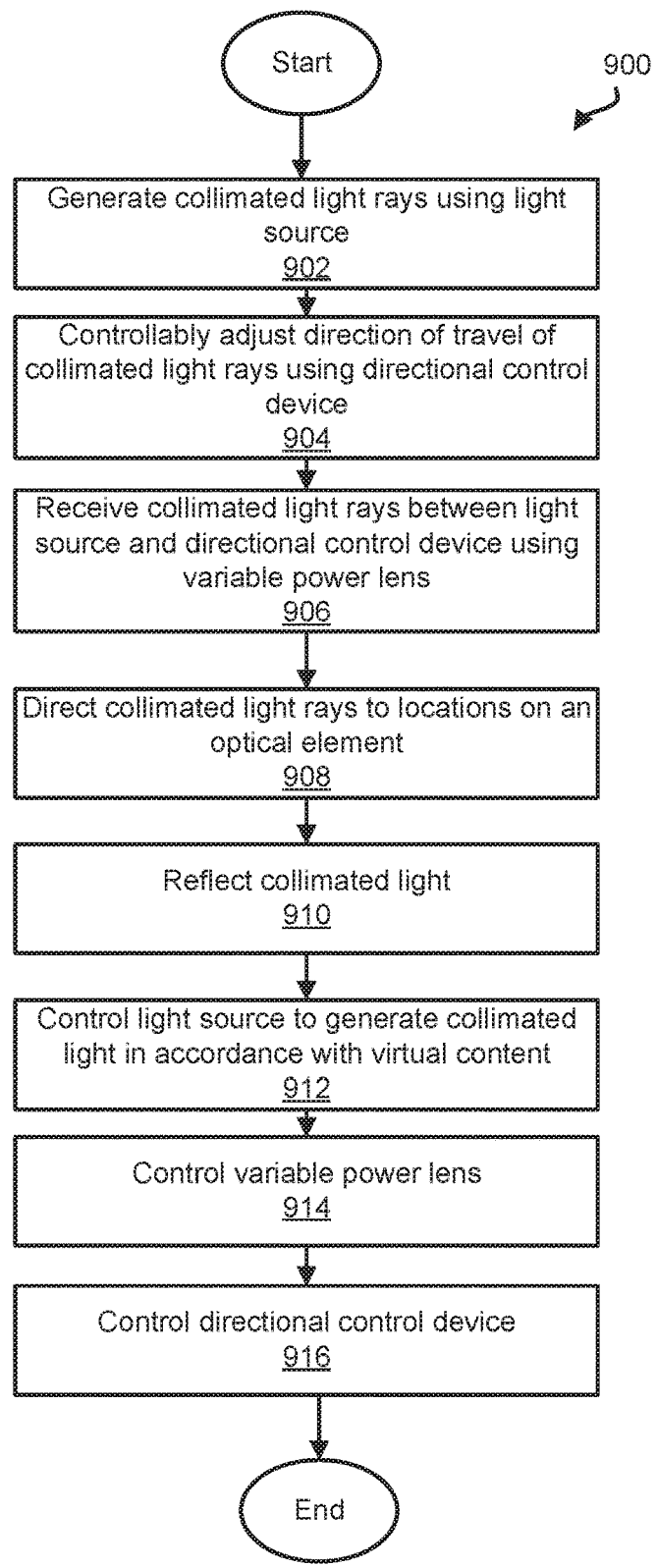
FIG. 9 illustrates a method to provide views of virtual content in an interactive space, in accordance with one or more implementations.

FIG. 9 illustrates a method 900 of providing views of virtual content in an interactive space, in accordance with one or more implementations. The operations of method 900 presented below are intended to be illustrative. In some implementations, method 900 may be accomplished with one or more additional operations not described, and/or without one or more of the operations discussed. Additionally, the order in which the operations of method 900 are illustrated in FIG. 9 and described below is not intended to be limiting.

In some implementations, method 900 may be implemented in a computer system comprising one or more of non-transitory electronic storage storing machine-readable instructions, one or more processing devices (e.g., a physical processor, a digital processor, an analog processor, a digital circuit designed to process information, an analog circuit designed to process information, a state machine, and/or other mechanisms for electronically processing information), one or more light sources, or variable power lenses, one or more directional control devices, one or more beam steering devices, one or more optical elements, and/or other components. The one or more processing devices may include one or more devices executing some or all of the operations of method 900 in response to instructions stored electronically on electronic storage medium. The one or more processing devices may include one or more devices configured through hardware, firmware, and/or software to be specifically designed for execution of one or more of the operations of method 900.

At an operation 902, collimated light and/or other light may be generated. In some implementations, operation 902 may be performed using one or more light sources the same or similar to one or more lights sources 120 (shown in FIG. 1 and described herein).

At an operation 904, direction of travel of collimated light may be controllably adjusted. In some implementations, operation 904 may be performed using one or more directional control devices the same as or similar to one or more directional control devices 122 (shown in FIG. 1 and described herein).

At an operation 906, collimated light rays may be received between a light source and a directional control device. In some implementations, operation 906 may be performed using one or more variable power lenses the same as or similar to one or more variable power lenses 124 (shown in FIG. 1 and described herein).

At an operation 908, collimated light may be directed to locations on one or more optical elements. In some implementations, operation 908 may be performed using one or more beam steering devices the same as or similar to one or more beam steering devices 126 (shown in FIG. 1 and described herein).

At an operation 910, collimated light may be reflected into a user's eye(s) in a focal plane of a perceived three-dimensional light field. In some implementations, operation 910 may be performed using one or more optical elements the same as or similar to one or more optical elements 128 (shown in FIG. 1 and described herein).

At an operation 912, one or more light sources may be controlled to generate collimated light rays in accordance with virtual content to be perceived at a perceived range of a focal plane of a perceived three-dimensional light field. In some implementations, operation 912 may be performed by one or more physical processors executing a light control component the same as or similar to light control component 110 (shown in FIG. 1 and described herein).

At an operation 914, one or more variable power lenses may be controlled to adjust individual focal lengths of the individual variable power lenses. In some implementations, control of a variable power lens may impact a perceived range of a focal plane within a perceived three-dimensional light field. In some implementations, operation 914 may be performed by one or more physical processors executing a lens control component the same as or similar to lens control component 112 (shown in FIG. 1 and described herein).

At an operation 916, one or more directional control devices may be controlled to adjust direction of travel of collimated light rays toward one or more beam steering devices. Control of a directional control device may impact a perceived location of virtual content on a focal plane. In some implementations, operation 916 may be performed by one or more physical processors executing a direction control component the same as or similar to direction control component 114 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide views of virtual content in an interactive space, the system comprising:
    a light source configured to generate light rays forming images of the virtual content; a directional control device configured to controllably adjust direction of travel of the light rays over time toward a beam steering device;
    a variable power lens positioned to receive the light rays between the light source and the directional control device;
    the beam steering device, configured to direct the light rays to locations on an optical element, individual locations on the beam steering device having corresponding locations on the optical element;
    the optical element, configured to reflect the light rays directed at the optical element via the beam steering device to an eye of a user, the light rays forming the image of virtual content at a focal plane of a three-dimensional light field; and
    one or more physical processors configured by machine-readable instructions to:
        control the light source to generate the light rays in accordance with the virtual content to be perceived by the user at a range of the focal plane of the three-dimensional light field;
        control the variable power lens to adjust a focal length of the variable power lens, wherein control of the variable power lens impacts the range of the virtual content within the three-dimensional light field; and
        control the directional control device to adjust the direction of travel of the light rays toward the beam steering device, where control of the directional control device impacts a location of the virtual content on the focal plane perceived by the user.

2. The system of claim 1, wherein the light source is an RGB laser.

3. The system of claim 1, wherein the variable power lens is a liquid lens.

4. The system of claim 1, wherein the directional control device is a micro-electrical-mechanical system.

5. The system of claim 1, wherein the optical element comprises a reflective or semi-reflective region.

6. The system of claim 1, wherein the one or more physical processors are further configured by machine-readable instructions to:
    determine distance information conveying distance of one or more real-world objects along a present gaze direction of a user, the distance information conveying a first distance of a first real-world object along the gaze direction for a first period of time; and
    control the variable power lens such that the range of the focal plane corresponds to the first distance during the first period of time.

7. The system of claim 6, further comprising a gaze tracking device, the gaze tracking device configured to generate output signals conveying the gaze direction.

8. The system of claim 1, wherein controlling the variable power lens to increase the focal length of the variable lens increases the perceived range of the focal plane, and controlling the variable power lens to decrease the focal length of the variable lens decreases the range of the focal plane.

9. The system of claim 1, wherein one or more of the light source, the variable power lens, the directional control device, the beam steering device, the optical element, or one or more physical processors are incorporated into a head-mounted display.

10. The system of claim 1, wherein the beam steering device is controllable.

11. A method of providing views of virtual content in an interactive space, the method comprising:
    generating, using a light source, light rays;
    controllably adjusting, using a directional control device, direction of travel of the light rays over time toward a beam steering device;
    receiving, using a variable power lens, the light rays between the light source and the directional control device;
    directing, using a beam steering device, the light rays to locations on an optical element, individual locations on the beam steering device having corresponding locations on the optical element;

reflecting into an eye of a user, using the optical element, the light rays directed at the optical element via the beam steering device in a focal plane of a three-dimensional light field;

controlling the light source to generate the light rays in accordance with the virtual content to be perceived by the user at a range of the focal plane of the three-dimensional light field;

controlling the variable power lens to adjust a focal length of the variable lens, wherein control of the variable power lens impacts the range of the focal plane within the three-dimensional light field; and controlling the directional control device to adjust the direction of travel of the light rays toward the beam steering device, where control of the directional control device impacts a location of the virtual content on the focal plane perceived by the user.

12. The method of claim 11, wherein the light source is an RGB laser.

13. The method of claim 11, wherein the variable power lens is a liquid lens.

14. The method of claim 11, wherein the directional control device is a micro-electrical-mechanical system.

15. The method of claim 11, wherein the optical element comprises a reflective or semi-reflective region.

16. The method of claim 11, further comprising:

determining distance information conveying distance of one or more real-world objects along a present gaze direction of a user, the distance information conveying a first distance of a first real-world object along the gaze direction for a first period of time; and controlling the variable power lens such that the range of the focal plane corresponds to the first distance during the first period of time.

17. The method of claim 16, further comprising generating output signals conveying the gaze direction.

18. The method of claim 11, wherein controlling the variable power lens to increase the focal length of the variable lens increases the range of the focal plane, and controlling the variable power lens to decrease the focal length of the variable lens decreases the range of the focal plane.

19. The method of claim 1, wherein one or more of the light source, the variable power lens, the directional control device, the beam steering device, or the optical element are incorporated into a head-mounted display.

20. The method of claim 11, further comprising controlling the beam steering device.

* * * * *